United States Patent
Tajima

(10) Patent No.: US 7,974,584 B2
(45) Date of Patent: Jul. 5, 2011

(54) WIRELESS COMMUNICATION SYSTEM

(75) Inventor: Yoshiharu Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1001 days.

(21) Appl. No.: 11/882,926

(22) Filed: Aug. 7, 2007

(65) Prior Publication Data

US 2007/0281688 A1 Dec. 6, 2007

Related U.S. Application Data

(63) Continuation of application No. PCT/JP2005/001905, filed on Feb. 9, 2005.

(51) Int. Cl.
*H04B 7/00* (2006.01)

(52) U.S. Cl. ............... 455/69; 455/70; 370/230

(58) Field of Classification Search ............ 455/69, 455/442, 436, 502, 503, 522; 370/229–230, 370/236, 347, 442

See application file for complete search history.

(56) References Cited

U.S. PATENT DOCUMENTS

| 7,292,863 | B2 * | 11/2007 | Chen et al. | 455/452.2 |
| 2004/0152422 | A1 * | 8/2004 | Hoglund et al. | 455/67.11 |
| 2004/0166884 | A1 * | 8/2004 | Oh et al. | 455/522 |
| 2004/0196870 | A1 | 10/2004 | Cheng et al. | |

FOREIGN PATENT DOCUMENTS

| JP | 2000-341292 | 12/2000 |
| JP | 2004-208197 | 7/2004 |

OTHER PUBLICATIONS

3GPP TS 25.309 V0.2.0 (Jun. 2004); 3rd Generation Partnership Project; Technical Specification Group Radio Access Network; FDD Enhanced Uplink; Overall description; Stage 2.
Tdoc#R2-041997; TSG RAN WG2 Meeting #44; Sophia-Antipolis, France; Oct. 4-8, 2004.

* cited by examiner

*Primary Examiner* — Dwayne D Bost
*Assistant Examiner* — Inder Mehra
(74) *Attorney, Agent, or Firm* — Myers Wolin, LLC.

(57) ABSTRACT

A wireless communication system capable of eliminating interference accompanying uplink transmission at the time of diversity handover, thereby improving the quality of wireless communication. An uplink quality measurer measures an uplink quality representing the quality of uplink data, and a transmission decision unit compares the measured uplink quality with a reference value to determine whether to accept or reject transmission of the uplink data and transmits a transmission acceptance/rejection signal in accordance with the comparison result. A transmission acceptance/rejection signal receiver of a terminal receives the transmission acceptance/rejection signals from a plurality of base stations with which the terminal is connected by diversity handover, and an uplink data transmission controller transmits the uplink data only when it is judged based on the transmission acceptance/rejection signals that there is no base station rejecting the transmission of the uplink data.

10 Claims, 19 Drawing Sheets

WIRELESS COMMUNICATION SYSTEM

This application is a continuing application, filed under 35 U.S.C. §111(a), of International Application PCT/JP2005/001905, filed Feb. 9, 2005.

BACKGROUND OF THE INVENTION

1. Field of the Invention

The present invention relates to wireless communication systems, and more particularly, to a wireless communication system for performing wireless communication such as by W-CDMA (Wideband-Code Division Multiple Access).

2. Description of the Related Art

W-CDMA is one of the wireless communication interfaces determined by IMT-2000 (International Mobile Telecommunications-2000) and is currently the leading wireless communication scheme. W-CDMA enables the access to multimedia such as sound, video and data at a maximum transmission rate of 384 Kbps.

Also, in recent years, wireless communication schemes called HSDPA (High Speed Downlink Packet Access) and HSUPA (High Speed Uplink Packet Access), which are based on W-CDMA technology, have been actively researched and developed. HSDPA and HSUPA allow, in existing W-CDMA systems, packets to be transmitted at high speeds in the downlink and uplink directions, respectively. HSDPA is standardized by 3GPP (3rd Generation Partnership Project) Release 5, and HSUPA by 3GPP Release 6.

FIG. 15 is a conceptual diagram illustrating W-CDMA communication. A base station 50 and terminals (UEs: User Equipments) 60-1 to 60-n communicate with each other in accordance with conventional W-CDMA.

On the uplink (user equipments 60-1 to 60-n→base station 50), DPDCH (Dedicated Physical Data CHannel), which is user information, and DPCCH (Dedicated Physical Control CHannel), which is control information, are transmitted to the base station 50 while being mapped respectively onto the in-phase component (I axis) and quadrature component (Q axis) of QPSK (Quadrature Phase Shift Keying) modulation.

On the other hand, on the downlink (base station 50→user equipments 60-1 to 60-n), DPDCH and DPCCH are transmitted to the user equipments 60-1 to 60-n by time-division multiplexing. These links are dedicated channels allocated to individual user equipments for the purpose of communication exclusively with the intended user equipments.

FIG. 16 is a conceptual diagram illustrating HSDPA communication. Downlink information is transmitted from the base station 50 to the user equipments 60-1 to 60-n by HSDPA. The user equipments 60-1 to 60-n individually receive a pilot signal f from the base station 50, then measure their respective propagation environments (received field strengths), and notify the base station 50 of the measurement results by HS-DPCCH (High Speed Dedicated Physical Control CHannel).

Based on the propagation environment information received from the user equipments 60-1 to 60-n, the base station 50 carries out scheduling to preferentially select a predetermined number of user equipments that are situated in good propagation environments.

If, as a result of the scheduling, the user equipments 60-1 and 60-2 are selected, for example, scheduling information (information including the type of modulation, the amount of transmission, etc.) is transmitted to the user equipments 60-1 and 60-2 by HS-SCCH (High Speed Shared Control CHannel). On receiving the scheduling information, the user equipments 60-1 and 60-2 set their respective functions in accordance with the received information.

Subsequently, the base station 50 transmits user information to the user equipments 60-1 and 60-2 via a radio channel called HS-PDSCH (High Speed Physical Downlink Shared CHannel). HS-PDSCH carrying the user information is a shared channel that can be used in common by the user equipments 60-1 to 60-n with one time slot shared by one or more user equipments, and permits high-speed downlink access at a maximum rate of 14.4 Mbps.

FIG. 17 is a conceptual diagram illustrating HSUPA communication. Uplink information is transmitted from the user equipments 60-1 to 60-n to the base station 50 by HSUPA. The user equipments 60-1 to 60-n transmit REQ (Request), as an uplink data transmission request, to the base station 50.

The base station 50 collects REQs from the user equipments 60-1 to 60-n, then carries out scheduling to determine the timings for uplink transmissions from the user equipments on the basis of the communication qualities of the user equipments 60-1 to 60-n, the priority levels of uplink data, etc., and transmits Grant, as permission of uplink transmission, to the user equipments 60-1 to 60-n ("Grant" includes two types of grant, namely, "absolute grant" whereby an uplink transmission rate and the like are notified at regular intervals, and "relative grant" whereby update of the information carried by "absolute grant" is notified).

The user equipments 60-1 to 60-n transmit user information to the base station 50, in order of permission of uplink transmission based on the Grants, by using dedicated channels called E-DCH (Enhanced Dedicated CHannel) which permits high-speed uplink access (attempts are currently made to increase the transmission rate of E-DCH up to about 2 to 4 Mbps).

Much expectation is placed on HSDPA/HSUPA as techniques that enable higher-speed data transmission than conventional W-CDMA. For HSDPA, the system specification is being formulated, but with respect to HSUPA, the specification for implementing the system is currently still in an investigation stage.

As conventional HSDPA/HSUPA techniques, a technique has been proposed in which data including a frame size corresponding with the scheduling interval is received over a signaling interface and the received data is transmitted within the scheduling interval (e.g., US 2004/0196870 A1 (paragraph nos. [0024] to [0030], FIG. 2)).

As a user equipment travels between cells, the transfer of service from the currently serving cell to another, namely, handover, takes place. In W-CDMA, an equivalent process called diversity handover is executed.

Diversity handover is characterized in that a user equipment being handed over simultaneously connects with multiple cells, and permits handover to be effected without momentary interruption and thus without influencing a stream being transmitted, such as sound, video or data (diversity handover is also called soft handover).

Also in the HSUPA described above, diversity handover may be executed, but in this case, multiple base stations to which a user equipment is connected perform HSUPA scheduling independently of one another, whereas the user equipment can use the scheduling information provided by only one of the multiple base stations. Accordingly, for the base stations whose scheduling information is not used, uplink transmission is executed at undesired timing, giving rise to an interference problem.

FIGS. 18 and 19 illustrate the problem caused at the time of diversity handover in HSUPA. Base stations 51 to 53 have cells 51a to 53a, respectively, and a user equipment (UE) 61 is connected to the base stations 51 to 53 to carry out diversity handover. Let us consider the case where the user equipment 61 transmits uplink data by HSUPA at the time of diversity handover.

The user equipment 61 transmits an uplink data transmission request to the base stations 51 to 53. The base stations 51 to 53 individually collect uplink data transmission requests from the user equipments (including the user equipment 61 and others) situated within their respective cells and carry out scheduling independently of one another.

Consequently, as shown in FIG. 18, the base station 51 generates scheduling information permitting the user equipment 61 to transmit uplink data at timing T1, the base station 52 generates scheduling information permitting the user equipment 61 to transmit uplink data at timing T2, and the base station 53 generates scheduling information permitting the user equipment 61 to transmit uplink data at timing T3. Each of the base stations 51 to 53 transmits the generated scheduling information to the user equipment 61, so that the user equipment 61 receives the three items of scheduling information.

The user equipment 61 can use only one of the three timings T1 to T3, and it is assumed here that the timing T1 is selected, as shown in FIG. 19, for the transmission of uplink data to the base stations 51 to 53.

In this case, uplink data is transmitted at the timing T1, and therefore, the base stations 52 and 53 receive no data at the respective timings T2 and T3. This means that the base stations 52 and 53 uselessly performed their scheduling processes.

Also, the scheduling of the base station 52 permits the transmission of uplink data at the timing T2, and this means that the transmission of uplink data at the other timing is forbidden. Accordingly, the uplink data output from the user equipment 61 at the timing T1 is a desired wave to the base station 51 but is an undesired interference wave to the base station 52.

Similarly, the base station 53 permitted the transmission of uplink data at the timing T3, and therefore, the uplink data transmitted at the timing T1 from the user equipment 61 is nothing but an undesired interference wave to the base station 53. Such an interference wave significantly lowers communication quality.

SUMMARY OF THE INVENTION

The present invention was created in view of the above circumstances, and an object thereof is to provide a wireless communication system capable of eliminating interference accompanying uplink transmission at the time of diversity handover, thereby ensuring high-quality wireless communication.

To achieve the object, there is provided a wireless communication system for performing wireless communication. The wireless communication system comprises base stations and a terminal. The base stations each include an uplink quality measurer for measuring an uplink quality representing a quality of uplink data, and a transmission decision unit for comparing the measured uplink quality with a reference value to determine whether to accept or reject transmission of the uplink data, and transmitting a transmission acceptance/rejection signal in accordance with a comparison result. The terminal includes a transmission acceptance/rejection signal receiver for receiving the transmission acceptance/rejection signals from the base stations with which the terminal is connected by diversity handover, and an uplink data transmission controller for transmitting the uplink data only when it is judged based on the transmission acceptance/rejection signals that there is no base station rejecting the transmission of the uplink data.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
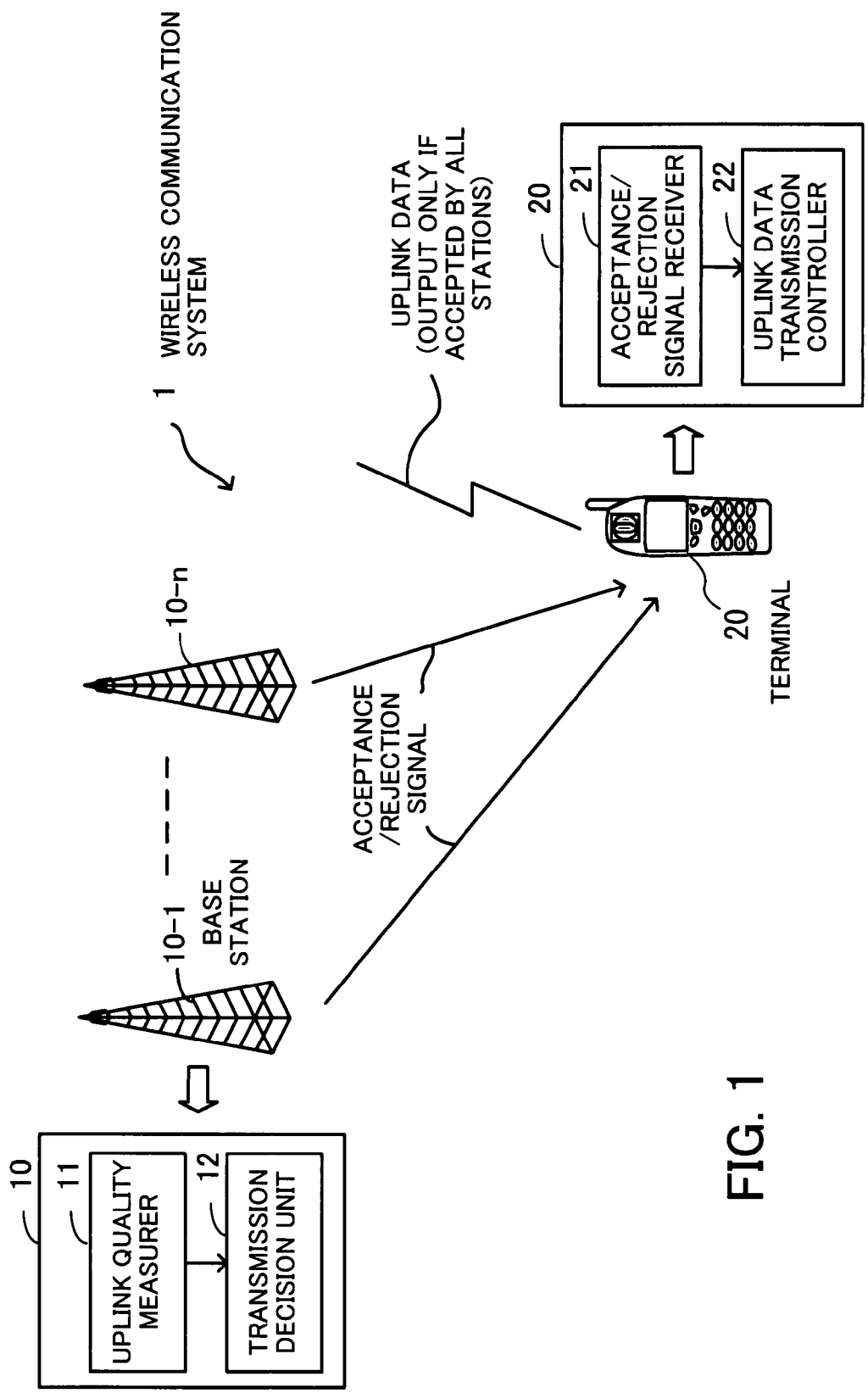
FIG. 1 illustrates the principle of a wireless communication system.

Preferred embodiments of the present invention will be described below with reference to the accompanying drawings, wherein like reference numerals refer to like elements throughout. FIG. 1 illustrates the principle of a wireless communication system. The wireless communication system 1 comprises base stations 10-1 to 10-n (when referred to generically, the base station 10) and a terminal 20 for performing wireless communication.

The base stations 10-1 to 10-n each comprise an uplink quality measurer 11 and a transmission decision unit 12. The uplink quality measurer 11 measures an uplink quality representing the quality of uplink data (as the uplink quality, an amount of interference or an amount of data is measured, for example, as described later). The transmission decision unit 12 compares the measured uplink quality with a reference value to determine whether to accept or reject transmission of the uplink data, and transmits a transmission acceptance/rejection signal in accordance with the comparison result.

The terminal (hereinafter user equipment (UE)) 20 comprises a transmission acceptance/rejection signal receiver 21 and an uplink data transmission controller 22. The transmission acceptance/rejection signal receiver 21 receives the transmission acceptance/rejection signals from the multiple base stations 10-1 to 10-n with which the terminal 20 is connected by diversity handover. The uplink data transmission controller 22 transmits the uplink data only when it is judged based on the transmission acceptance/rejection signals that there is no base station rejecting the transmission of the uplink data.

Figure 2:
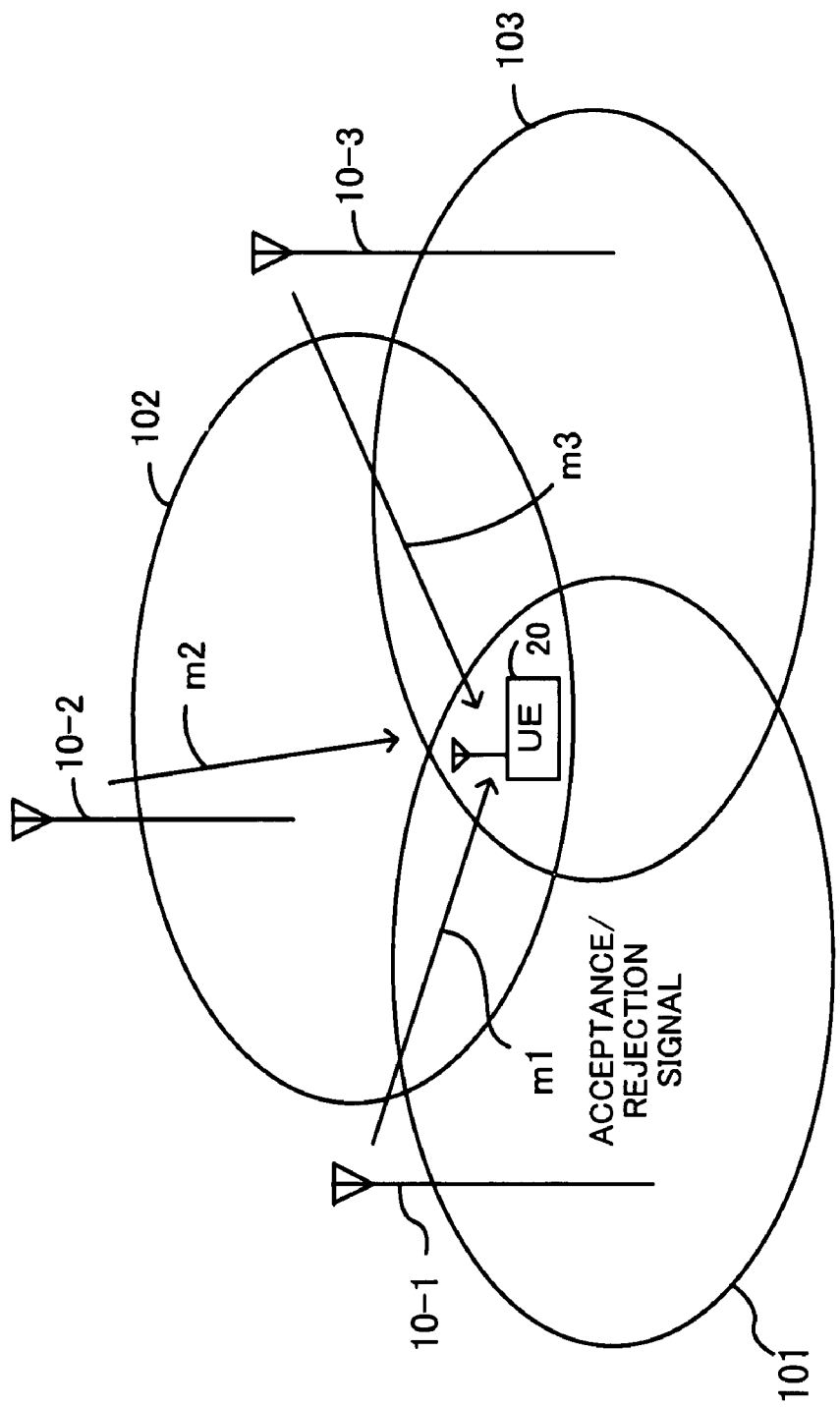
FIG. 2 illustrates operation of the wireless communication system.

Operation of the wireless communication system 1 will be now described with reference to FIGS. 2 and 3. The base stations 10-1 to 10-3 have cells 101 to 103, respectively. The user equipment 20 is connected to the base stations 10-1 to 10-3 to carry out diversity handover. Let us consider the case where the user equipment 20 transmits uplink data at the time of diversity handover.

The user equipment 20 transmits an uplink data transmission request to the base stations 10-1 to 10-3. The base stations 10-1 to 10-3 individually collect uplink data transmission requests from the user equipments (including the user equipment 20 and others) situated in their respective cells and carry out scheduling.

During the scheduling, the uplink quality measurer 11 of each of the base stations 10-1 to 10-3 measures the uplink quality of the corresponding cell. Also, the transmission decision unit 12 compares the measured uplink quality with a preset reference value and determines, based on the comparison result, whether to accept or reject transmission of the uplink data. The base stations 10-1 to 10-3 then transmit transmission acceptance/rejection signals m1 to m3, respectively, to the target user equipment (in this instance, the user equipment 20) to which high-speed uplink data transmission service is provided.

Figure 3:
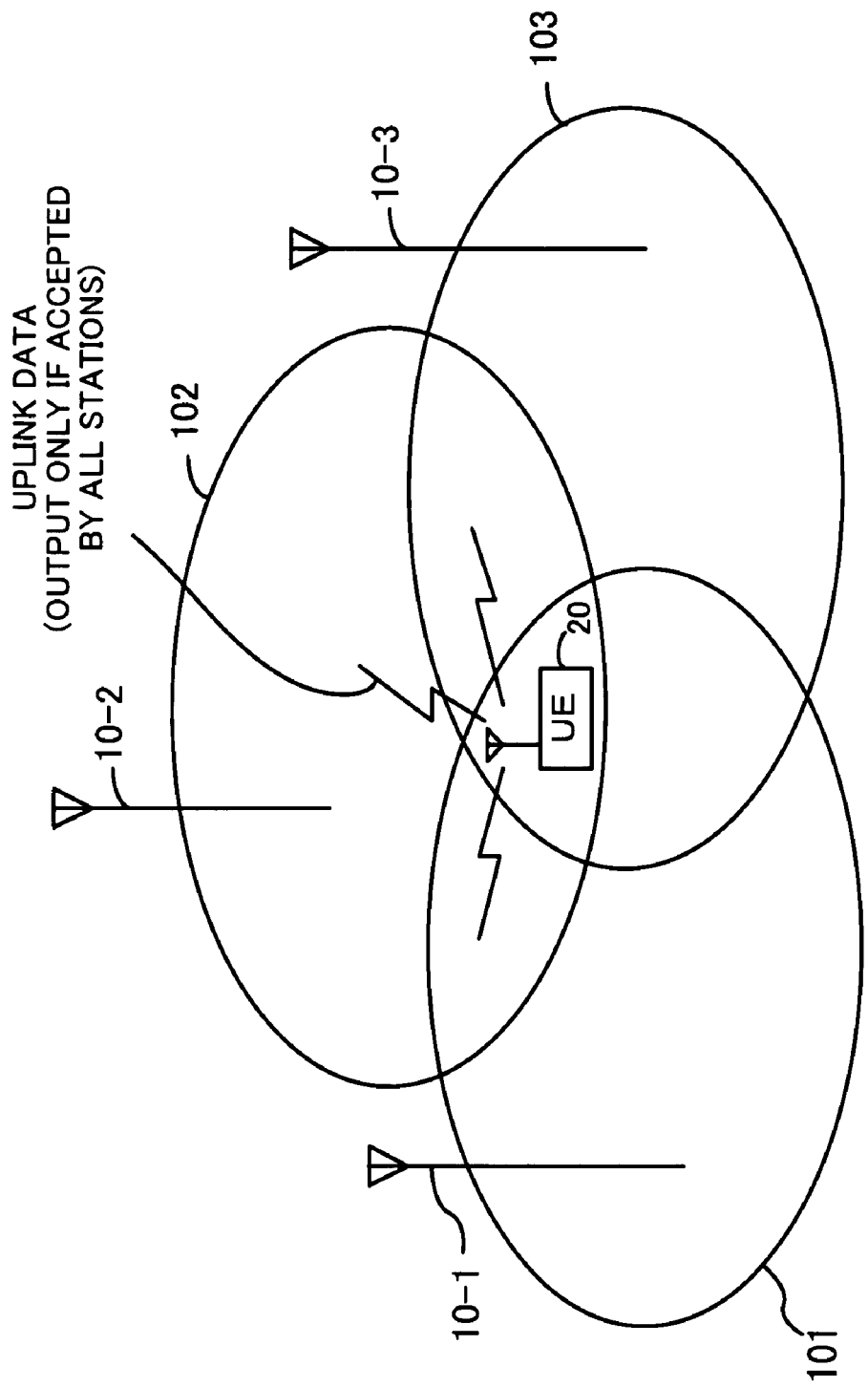
FIG. 3 also illustrates the operation of the wireless communication system.

Referring now to FIG. 3, the transmission acceptance/rejection signal receiver 21 of the user equipment 20 receives the transmission acceptance/rejection signals m1 to m3. The uplink data transmission controller 22 transmits the uplink data if all of the transmission acceptance/rejection signals m1 to m3 indicate acceptance of uplink transmission, and does not transmit the uplink data if any one of the transmission acceptance/rejection signals m1 to m3 indicates rejection of uplink transmission.

The above operation is applicable to HSUPA, and in this case, the uplink data is transmitted by E-DCH. The uplink data transmission controller 22 may also be configured to operate in such a manner that only when it is judged based on the transmission acceptance/rejection signals that there is no base station rejecting the uplink transmission, the uplink data is transmitted by E-DCH, and that when it is judged that there is even a single base station rejecting the uplink transmission, the uplink data is transmitted by means of the W-CDMA communication service without using the HSUPA communication service.

The following describes the manner of how the transmission acceptance/rejection signal is transmitted. When sending the transmission acceptance/rejection signal to user equipments, the transmission decision unit 12 may use either a shared channel to transmit the signal to all user equipments or dedicated channels to transmit the signal to the individual user equipments. To communicate the acceptance/rejection of uplink transmission, a specific bit on a physical channel or higher-layer control information may be used.

Figure 4:
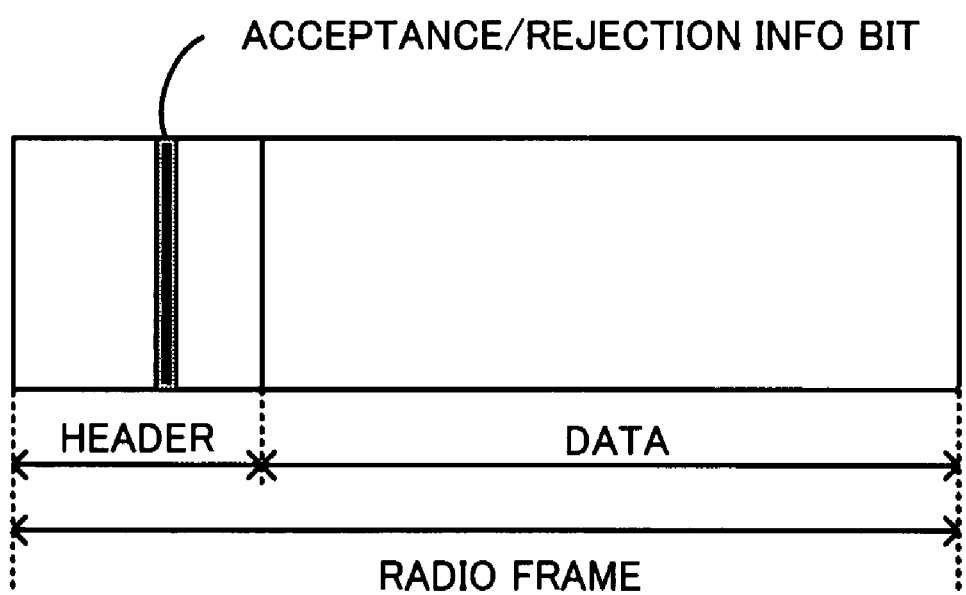
FIG. 4 shows a specific bit on a physical channel.

FIG. 4 shows such a specific bit on a physical channel. Namely, an unused field in the header of a radio frame is used to transmit information about the acceptance/rejection of uplink transmission. Since only the acceptance/rejection of uplink transmission needs to be notified, one bit suffices.

Figure 5:
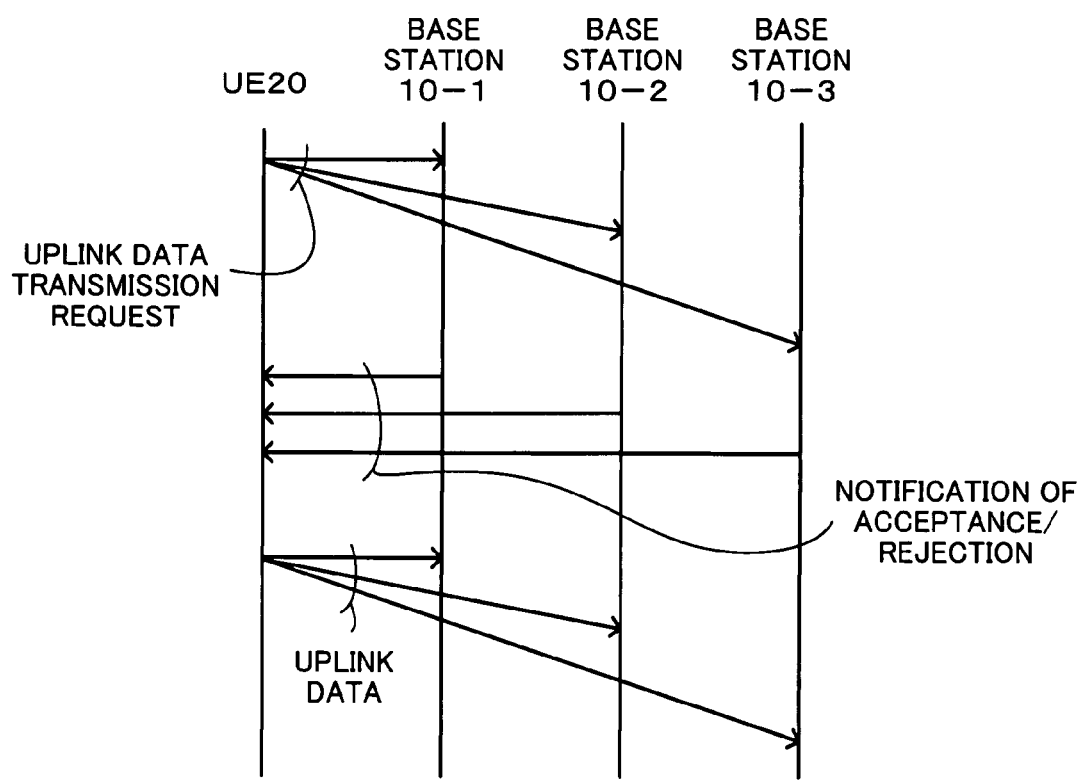
FIG. 5 shows an example of communicating the acceptance/rejection of transmission by means of higher-layer control information.

FIG. 5 illustrates an example of communicating the acceptance/rejection of uplink transmission by using higher-layer control information. An uplink data transmission request is transmitted from the user equipment 20 to the base stations 10-1 to 10-3, whereupon the base stations 10-1 to 10-3 individually carry out scheduling including the measurement of uplink quality, and transmit control information (corresponding to "Grant"), as a notification of acceptance/rejection of uplink transmission, to the user equipment 20. If all of the notifications show acceptance of uplink transmission, the user equipment 20 transmits the uplink data.

Figure 6:
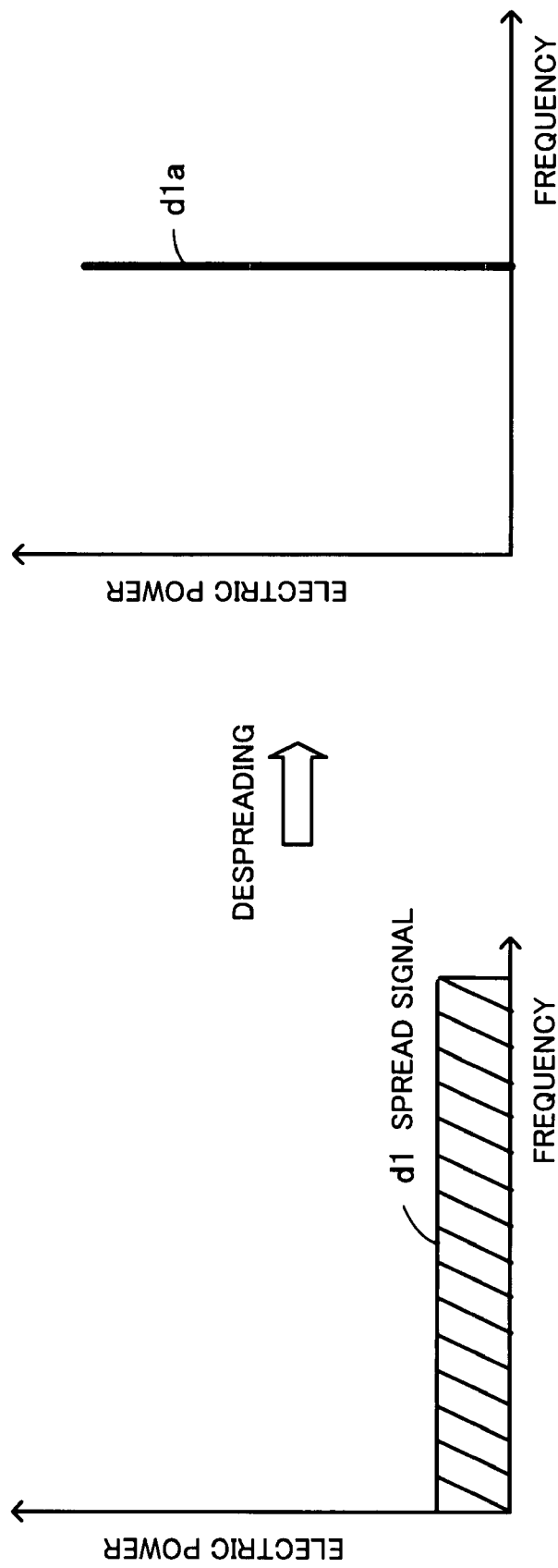
FIG. 6 illustrates the concept of interference amount.
Figure 7:
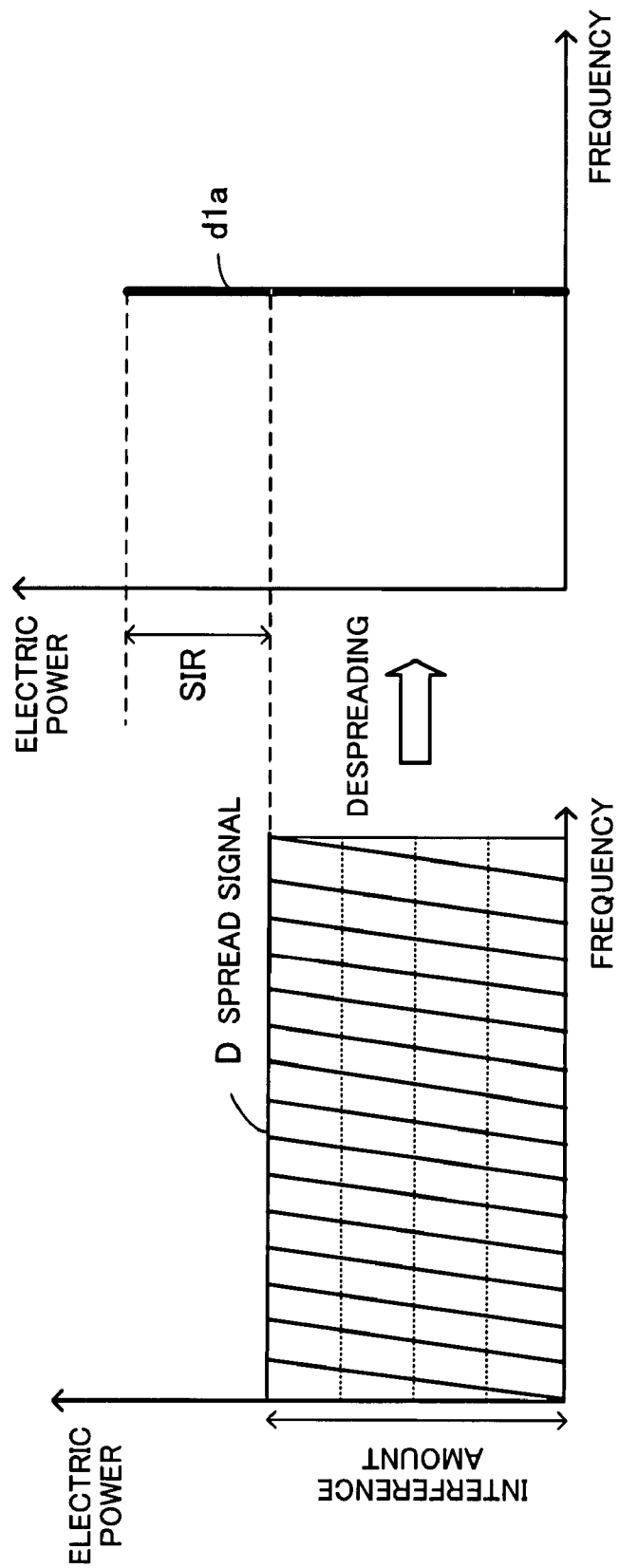
FIG. 7 also illustrates the concept of interference amount.

The following explains the case where the uplink quality is measured in terms of an amount of interference, as a first example. FIGS. 6 and 7 illustrate the concept of interference amount, wherein the vertical axis indicates electric power and the horizontal axis indicates frequency.

In CDMA, spread spectrum communication is performed in which at the transmitting side, a digital signal is spread over a wider band than that of the original signal by using a spreading code, and at the receiving side, the spread signal is demodulated into the original digital signal by using the same spreading code.

As shown in FIG. 6, the base station 10 as the receiving side despreads a received spread signal d1 by using a spreading code, to obtain desired data d1a. In practice, since numerous spread signals are propagated through the air, the base station 10 despreads a spread signal D including numerous spread signals superposed one upon another, as shown in FIG. 7, by using a single spreading code, to obtain the desired data d1a.

In this case, the difference between the power peak value of the spread signal D and that of the demodulated data d1a is the SIR (Signal-to-Interference Ratio), and if the SIR is smaller than a certain value, it is not possible to obtain with high accuracy the demodulated data d1a from the spread signal D.

Namely, the electric power level of the spread signal D represents an amount of interference with respect to the base station 10, and if the interference amount exceeds a given range, it is not possible to carry out high-accuracy spread spectrum communication. Accordingly, the base station 10 measures the interference amount as a parameter of uplink quality and determines whether to accept or reject transmission of uplink data in accordance with the measurement result.

Figure 8:
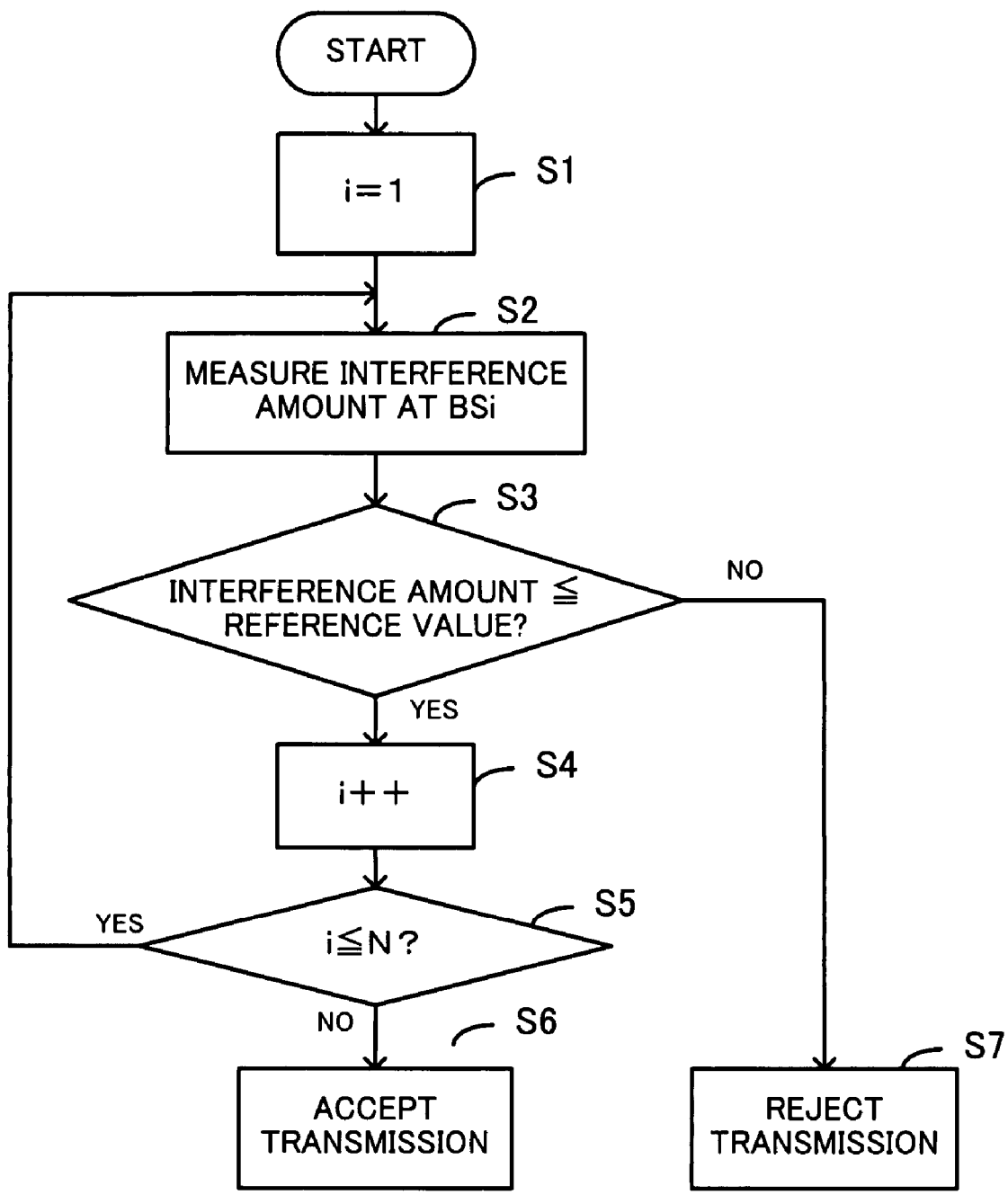
FIG. 8 is a flowchart illustrating the process of a base station for measuring the interference amount to determine whether to accept or reject transmission.

FIG. 8 is a flowchart illustrating the process of the base station 10 for measuring the interference amount to determine whether to accept or reject the uplink transmission. In the following, the base stations 10-1 to 10-n are denoted by BSi (i=1, 2, . . . ), and N represents the number of base stations which are in the process of diversity handover.

S1: The value i is set to "1" (i=1).

S2: The uplink quality measurer 11 of the base station BSi measures the interference amount of its own cell.

S3: The transmission decision unit 12 of the base station BSi compares the measured interference amount with a reference value. If the interference amount is smaller than or equal to the reference value, the process proceeds to Step S4; if the interference amount is greater than the reference value, the process proceeds to Step S7.

S4: The value i is incremented by "1".

S5: The transmission decision unit 12 of the base station BSi determines whether or not i≦N is fulfilled. If i≦N, the process returns to Step S2; if i>N, the process proceeds to Step S6.

S6: The transmission decision unit 12 of the base station BSi notifies the user equipment of the acceptance of uplink transmission by means of the transmission acceptance/rejection signal.

S7: The transmission decision unit 12 of the base station BSi notifies the user equipment of the rejection of uplink transmission by means of the transmission acceptance/rejection signal.

Figure 9:
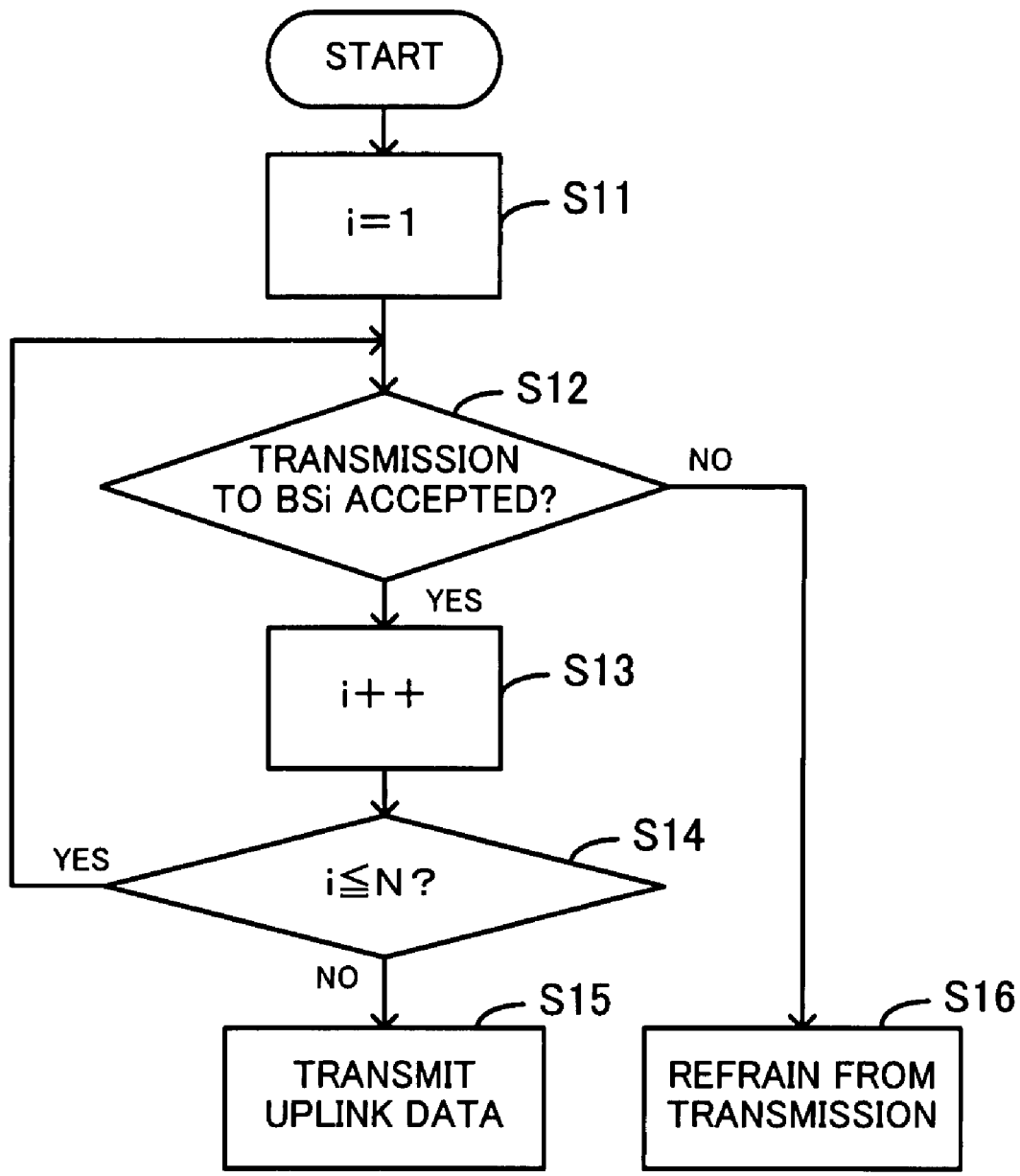
FIG. 9 is a flowchart illustrating the process of a user equipment.

FIG. 9 is a flowchart illustrating the process of the user equipment 20, or more specifically, the operation of the uplink data transmission controller 22.

S11: The value i is set to "1" (i=1).

S12: It is determined based on the transmission acceptance/rejection signal received from the base station BSi whether or not the transmission of uplink data to the base station BSi has been accepted. If the uplink transmission has been accepted, the process proceeds to Step S13; if the uplink transmission has been rejected, the process proceeds to Step S16.

S13: The value i is incremented by "1".

S14: It is determined whether or not i≦N is fulfilled. If i≦N, the process returns to Step S12; if i>N, the process proceeds to Step S15.

S15: The uplink data transmission controller 22 transmits the uplink data.

S16: The uplink data transmission controller 22 does not transmit the uplink data.

Figure 10:
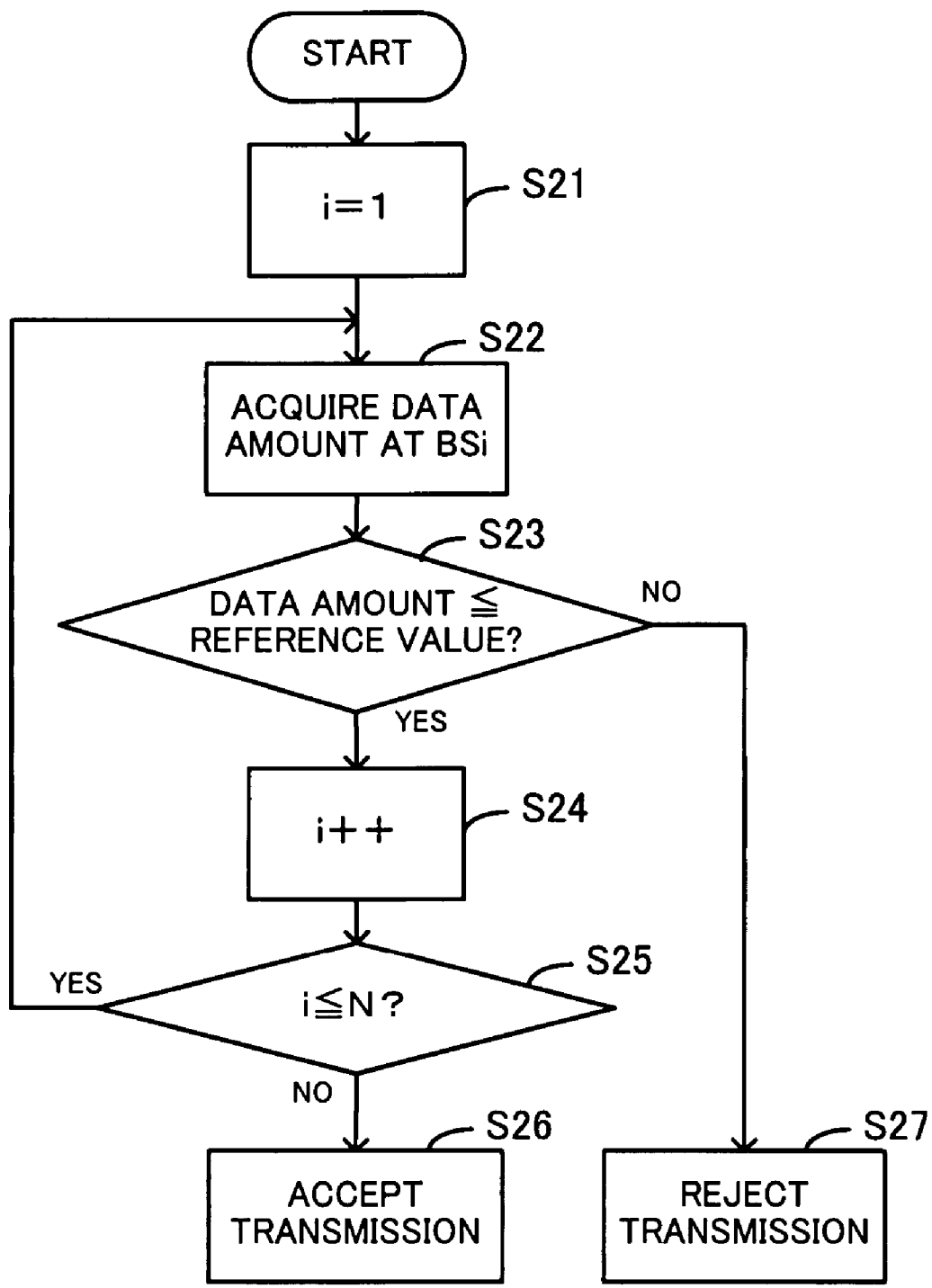
FIG. 10 is a flowchart illustrating the process of the base station for measuring a data amount to determine whether to accept or reject transmission.

The following describes the case where a data amount (amount of uplink data of the user equipment 20) is measured as the uplink quality. FIG. 10 is a flowchart illustrating the process of the base station 10 for measuring the data amount to determine whether to accept or reject the uplink transmission. The process executed by the user equipment 20 is identical with that shown in FIG. 9.

S21: The value i is set to "1" (i=1).

S22: The uplink quality measurer 11 of the base station BSi acquires the data amount (the uplink data transmission request transmitted from the user equipment 20 includes information about the amount of uplink data to be transmitted, and accordingly, the base station is previously notified of the data amount).

S23: The transmission decision unit 12 of the base station BSi compares the data amount with a reference value. If the data amount is smaller than or equal to the reference value, the process proceeds to Step S24; if the data amount is greater than the reference value, the process proceeds to Step S27 (if the data amount is greater than the reference value, it is reckoned that too much load will be imposed on the uplink data transmission control process).

S24: The value i is incremented by "1".

S25: The transmission decision unit 12 of the base station BSi determines whether or not i≦N is fulfilled. If i≦N, the process returns to Step S22; if i>N, the process proceeds to Step S26.

S26: The transmission decision unit 12 of the base station BSi notifies the user equipment of the acceptance of uplink transmission by means of the transmission acceptance/rejection signal.

S27: The transmission decision unit 12 of the base station BSi notifies the user equipment of the rejection of uplink transmission by means of the transmission acceptance/rejection signal.

A modification of the wireless communication system 1 will be now described. In the wireless communication system 1 of FIG. 1, whether to accept or reject uplink data transmission is determined based on the measured value of uplink quality; according to the modification, the level of uplink quality to which the currently recognized uplink quality would change if the uplink data were transmitted is estimated, and whether to accept or reject uplink data transmission is determined in accordance with the estimation result.

Figure 11:
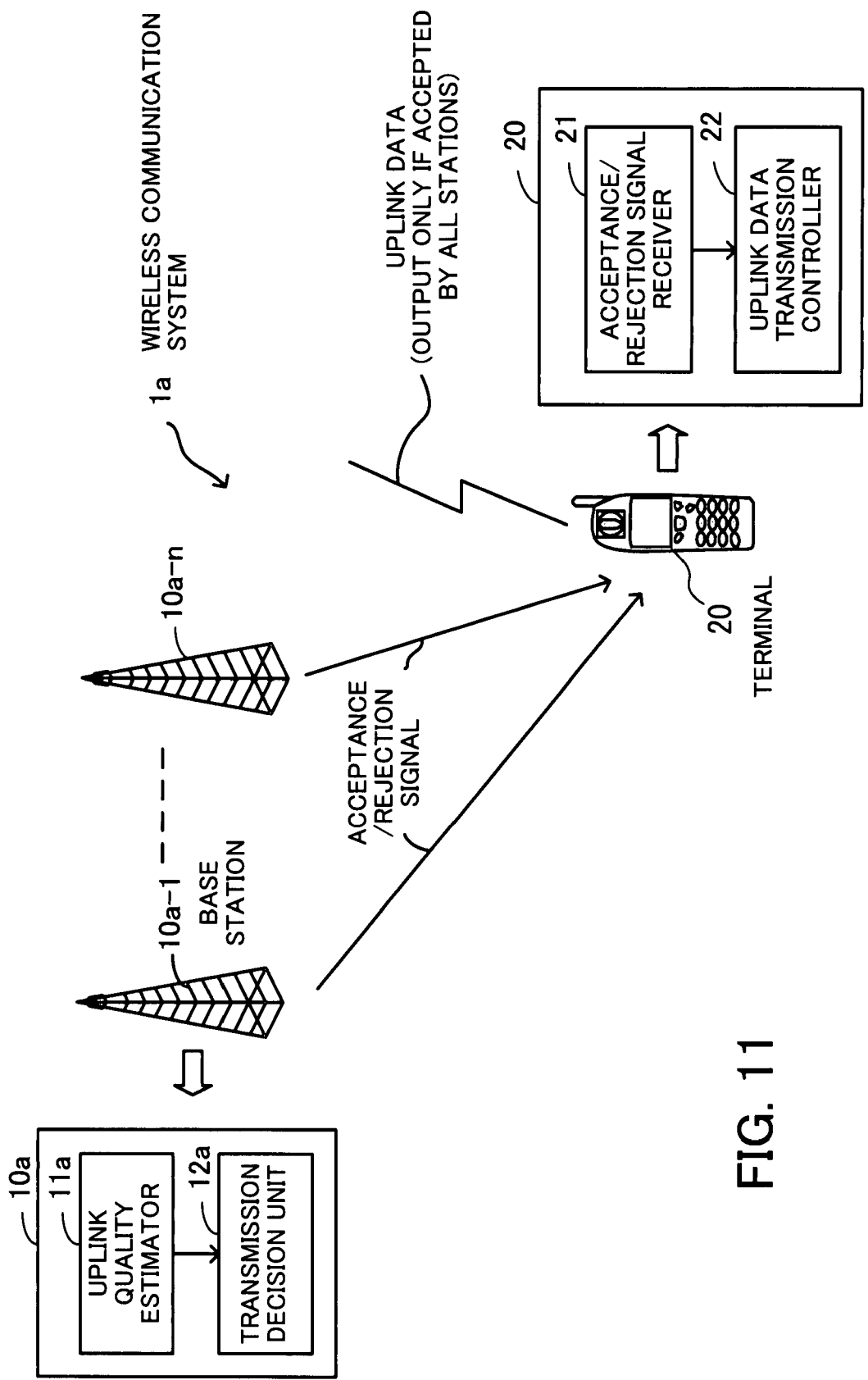
FIG. 11 illustrates the principle of a wireless communication system according to a modification of the invention.

FIG. 11 illustrates the principle of a wireless communication system according to the modification. The wireless communication system 1a comprises base stations 10a-1 to 10a-n and a user equipment 20. Each base station 10a includes an uplink quality estimator 11a and a transmission decision unit 12a (the user equipment 20 has a configuration identical with that shown in FIG. 1, and therefore, description thereof is omitted).

The uplink quality estimator 11a estimates the uplink quality representing the quality of uplink data. The transmission decision unit 12a determines whether to accept or reject transmission of the uplink data based on the result of uplink quality estimation, and transmits a corresponding transmission acceptance/rejection signal.

Figure 12:
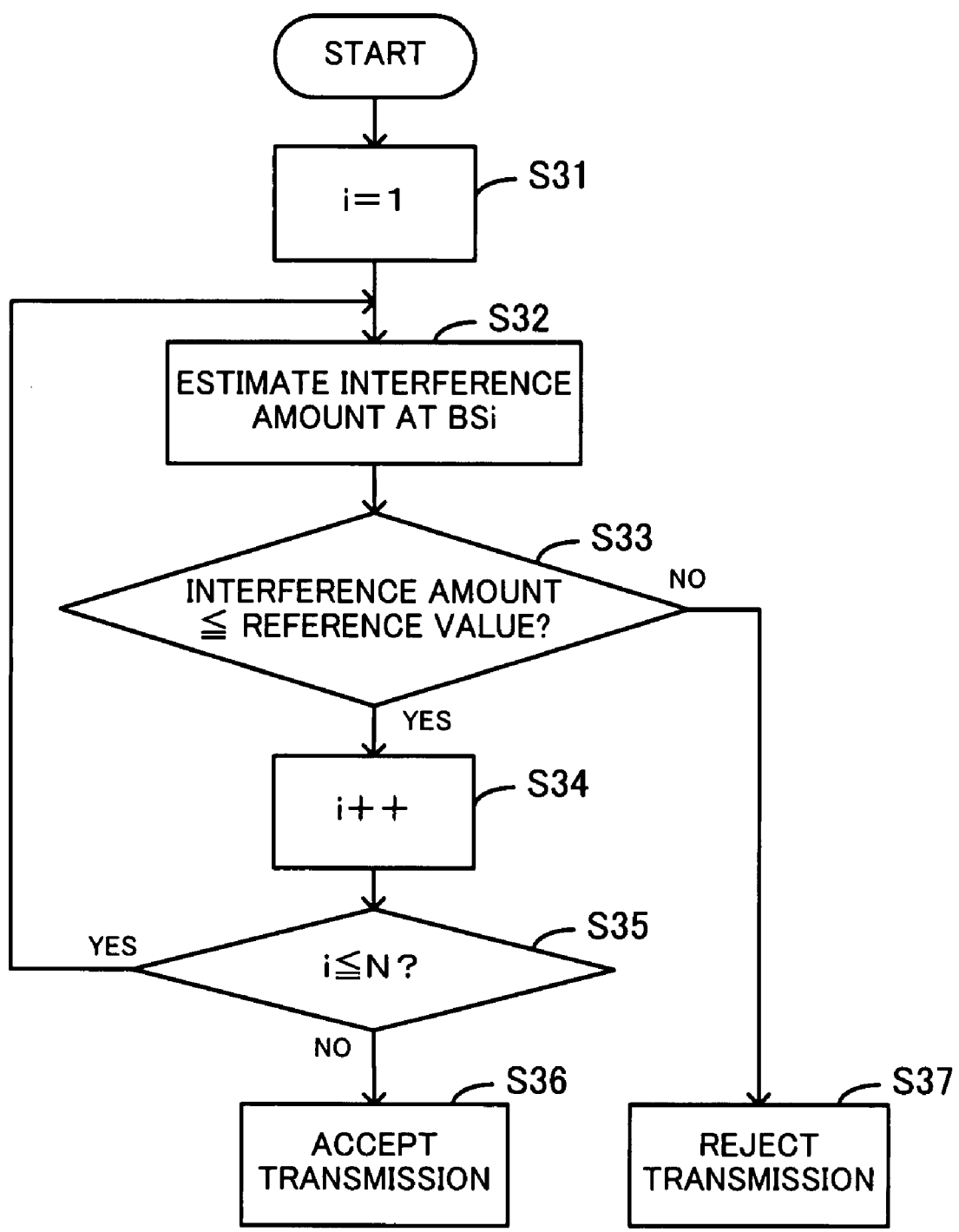
FIG. 12 is a flowchart illustrating the process of a base station for estimating the interference amount to determine whether to accept or reject transmission.

The following describes the cases where the interference amount, data amount and transmit power (uplink transmission power of the user equipment) are individually estimated as the uplink quality. FIG. 12 is a flowchart illustrating the process of the base station 10a for estimating the interference amount to determine whether to accept or reject the uplink transmission. In the following, the base stations 10a-1 to 10a-n are denoted by BSi (i=1, 2, . . . ), and N represents the number of base stations which are in the process of diversity handover.

S31: The value i is set to "1" (i=1).

S32: The uplink quality estimator 11a of the base station BSi acquires the current interference amount of its own cell, and estimates the level where the interference amount will be at the time when the uplink data transmission is controlled next, through the scheduling process for selecting preferential user equipments to which the high-speed uplink data transmission service is to be provided.

S33: The transmission decision unit 12a of the base station BSi compares the estimated interference amount with the reference value. If the estimated interference amount is smaller than or equal to the reference value, the process proceeds to Step S34; if the estimated interference amount is greater than the reference value, the process proceeds to Step S37.

S34: The value i is incremented by "1".

S35: The transmission decision unit 12a of the base station BSi determines whether or not i≦N is fulfilled. If i≦N, the process returns to Step S32; if i>N, the process proceeds to Step S36.

S36: The transmission decision unit 12a of the base station BSi notifies the user equipment of the acceptance of uplink transmission by means of the transmission acceptance/rejection signal.

S37: The transmission decision unit 12a of the base station BSi notifies the user equipment of the rejection of uplink transmission by means of the transmission acceptance/rejection signal.

Figure 13:
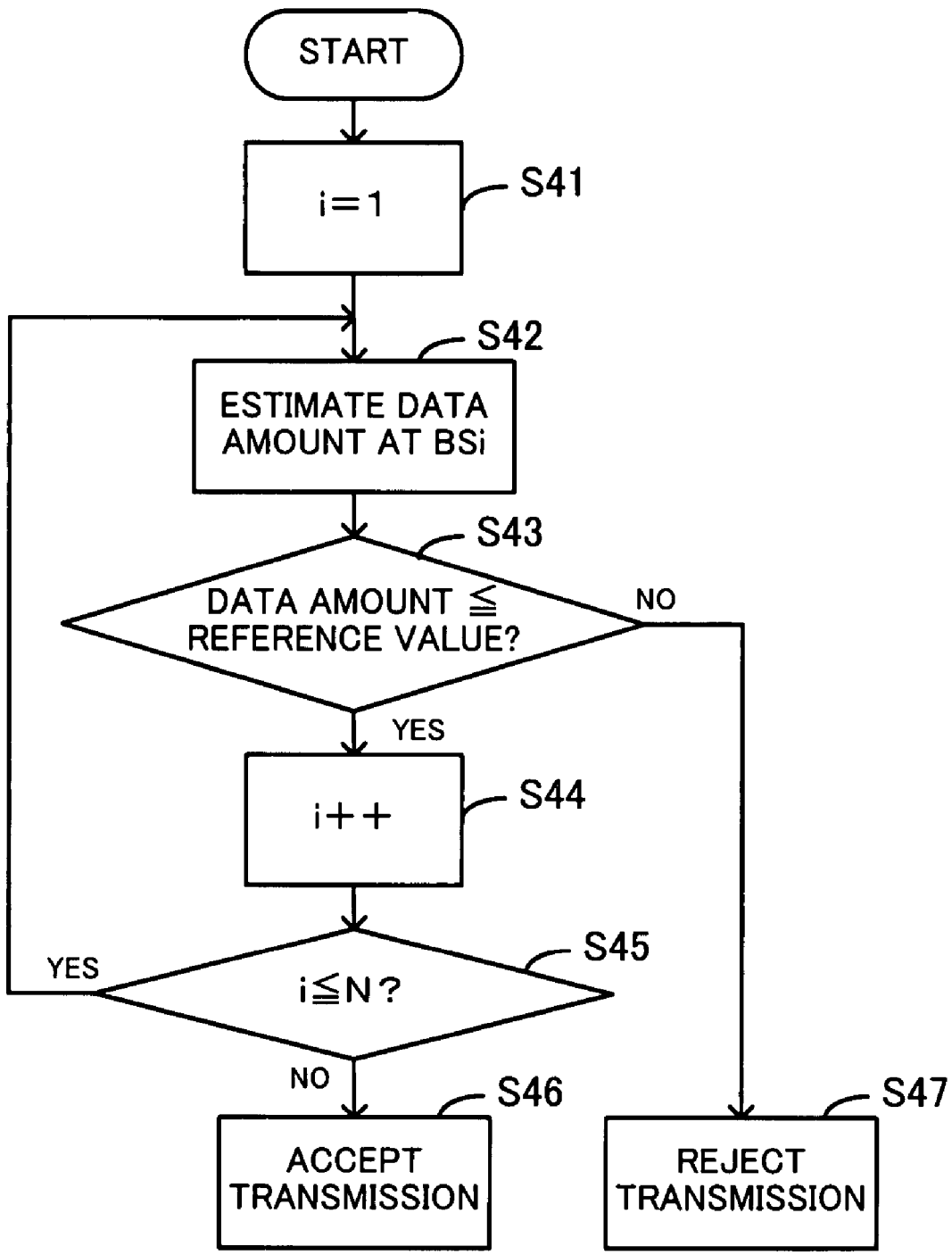
FIG. 13 is a flowchart illustrating the process of the base station for estimating the data amount to determine whether to accept or reject transmission.

FIG. 13 is a flowchart illustrating the process of the base station 10a for estimating the data amount to determine whether to accept or reject the uplink transmission.

S41: The value i is set to "1" (i=1).

S42: The uplink quality estimator 11a of the base station BSi estimates, through the scheduling process, the level where the uplink data amount will be at the time when the uplink data transmission is controlled next.

S43: The transmission decision unit 12a of the base station BSi compares the estimated data amount with the reference value. If the estimated data amount is smaller than or equal to the reference value, the process proceeds to Step S44; if the estimated data amount is greater than the reference value, the process proceeds to Step S47.

S44: The value i is incremented by "1".

S45: The transmission decision unit 12a of the base station BSi determines whether or not i≦N is fulfilled. If i≦N, the process returns to Step S42; if i>N, the process proceeds to Step S46.

S46: The transmission decision unit 12a of the base station BSi notifies the user equipment of the acceptance of uplink transmission by means of the transmission acceptance/rejection signal.

S47: The transmission decision unit 12a of the base station BSi notifies the user equipment of the rejection of uplink transmission by means of the transmission acceptance/rejection signal.

Figure 14:
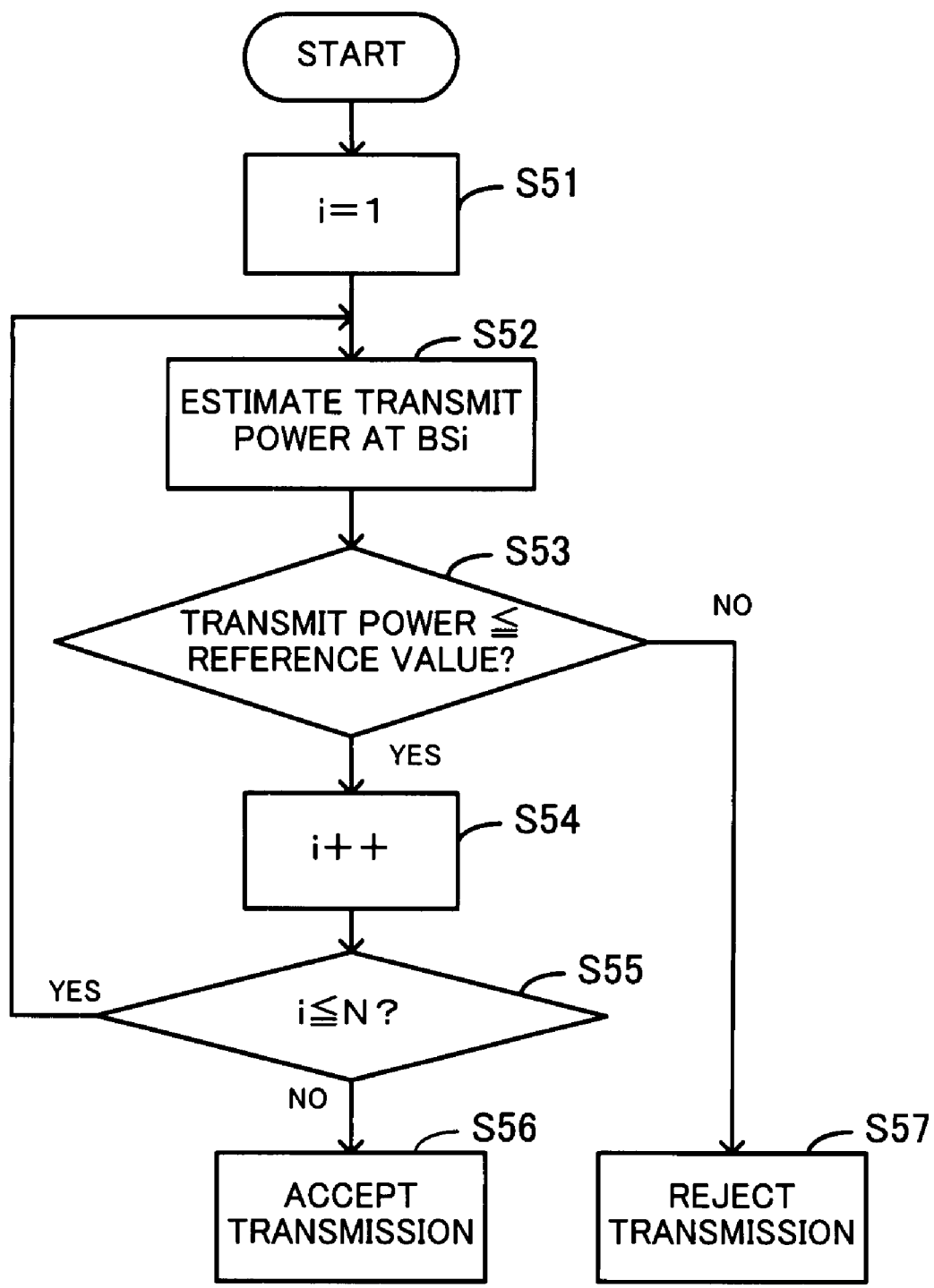
FIG. 14 is a flowchart illustrating the process of the base station for estimating transmit power to determine whether to accept or reject transmission.
Figure 15:
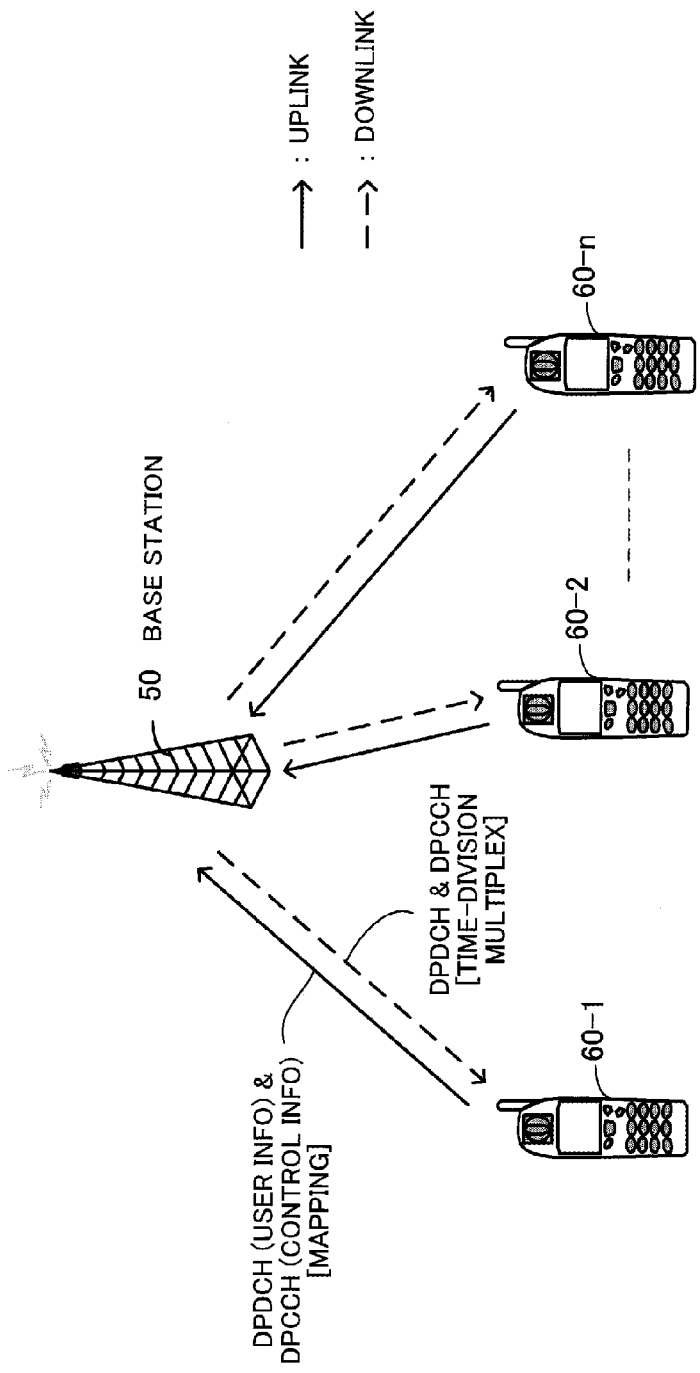
FIG. 15 is a conceptual diagram illustrating W-CDMA communication.
Figure 16:
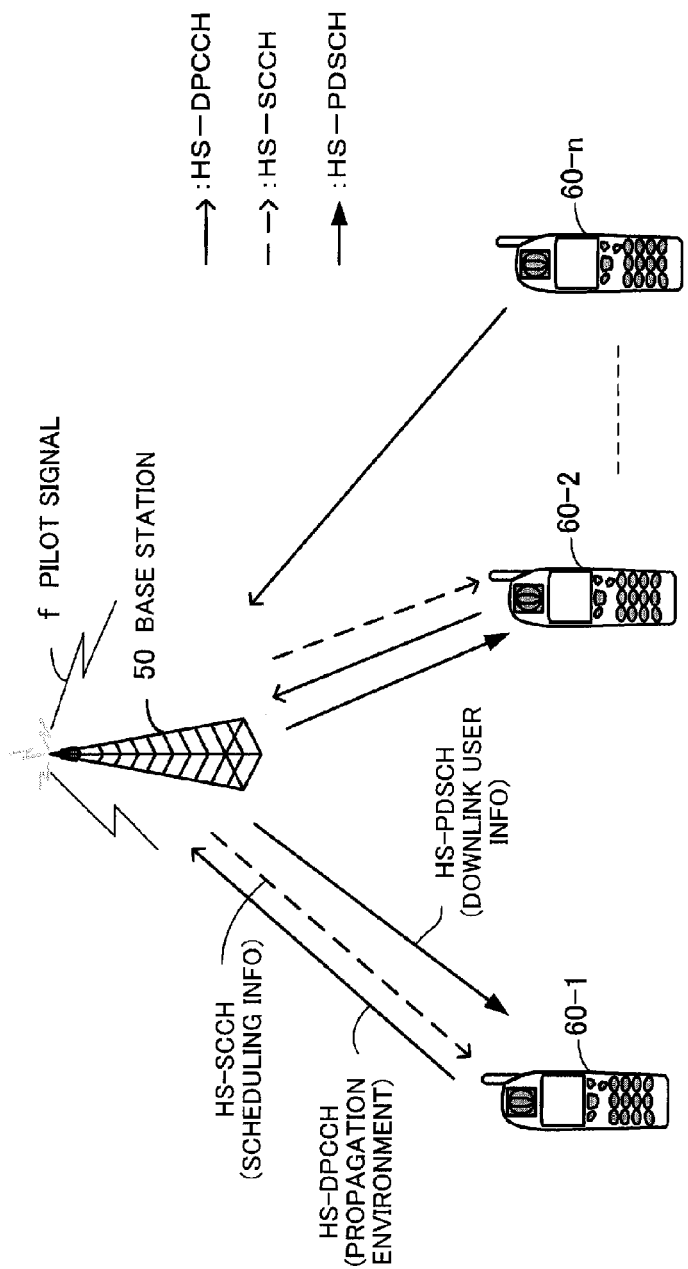
FIG. 16 is a conceptual diagram illustrating HSDPA communication.
Figure 17:
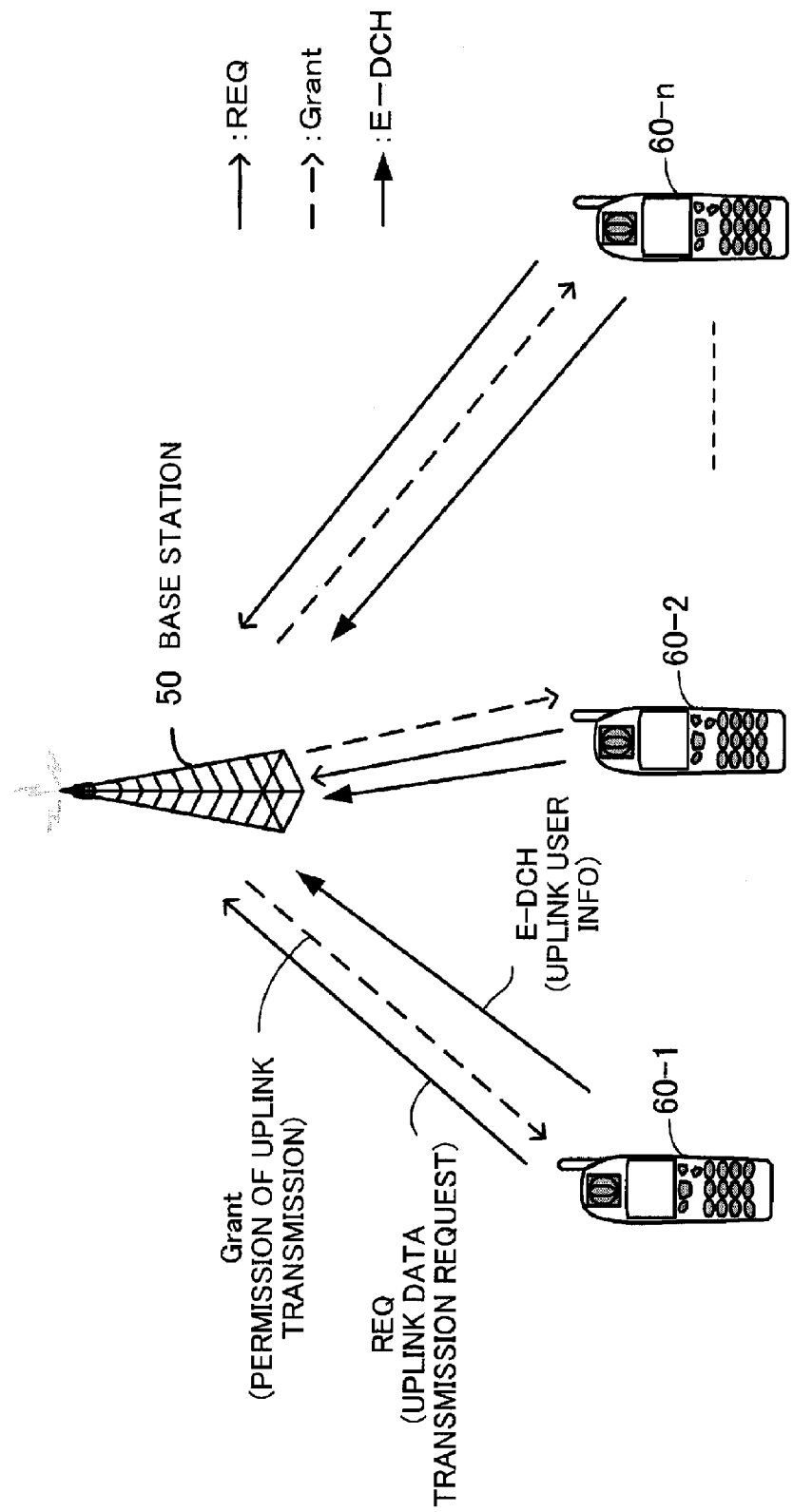
FIG. 17 is a conceptual diagram illustrating HSUPA communication.
Figure 18:
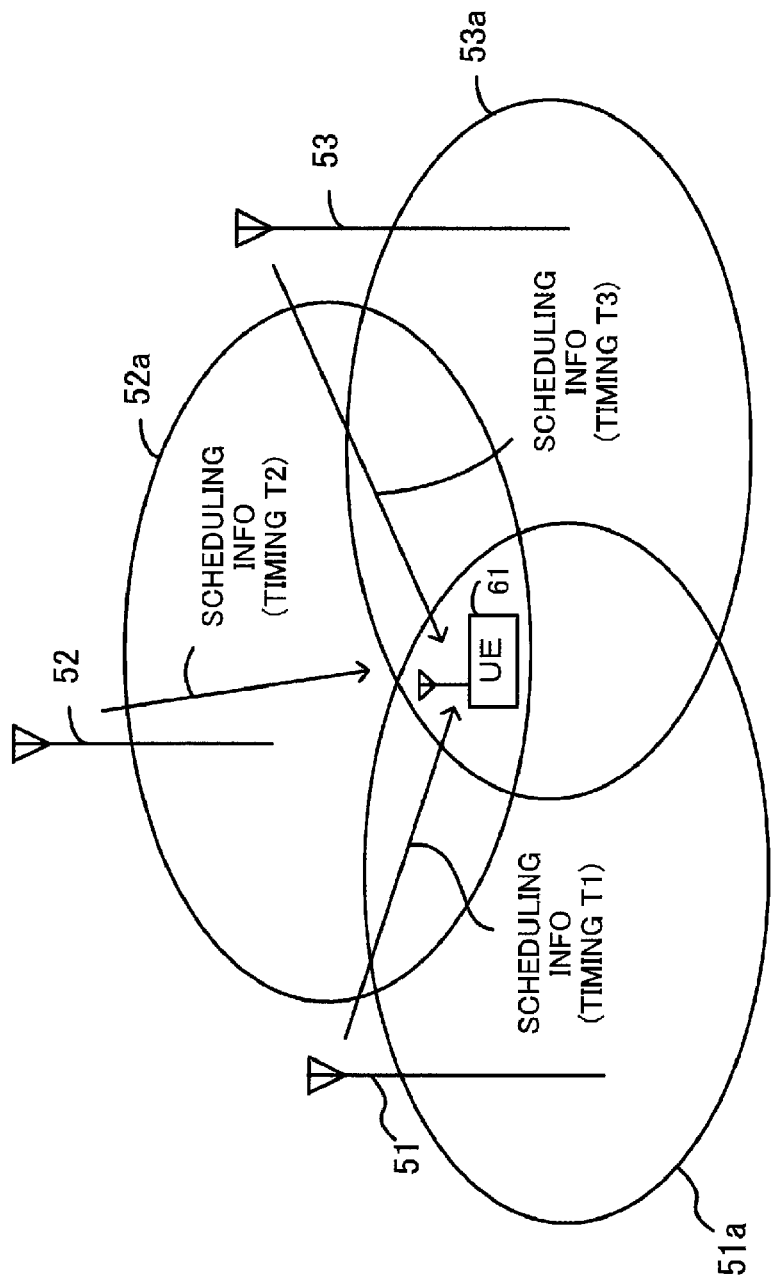
FIG. 18 illustrates a problem caused at the time of diversity handover in HSUPA.
Figure 19:
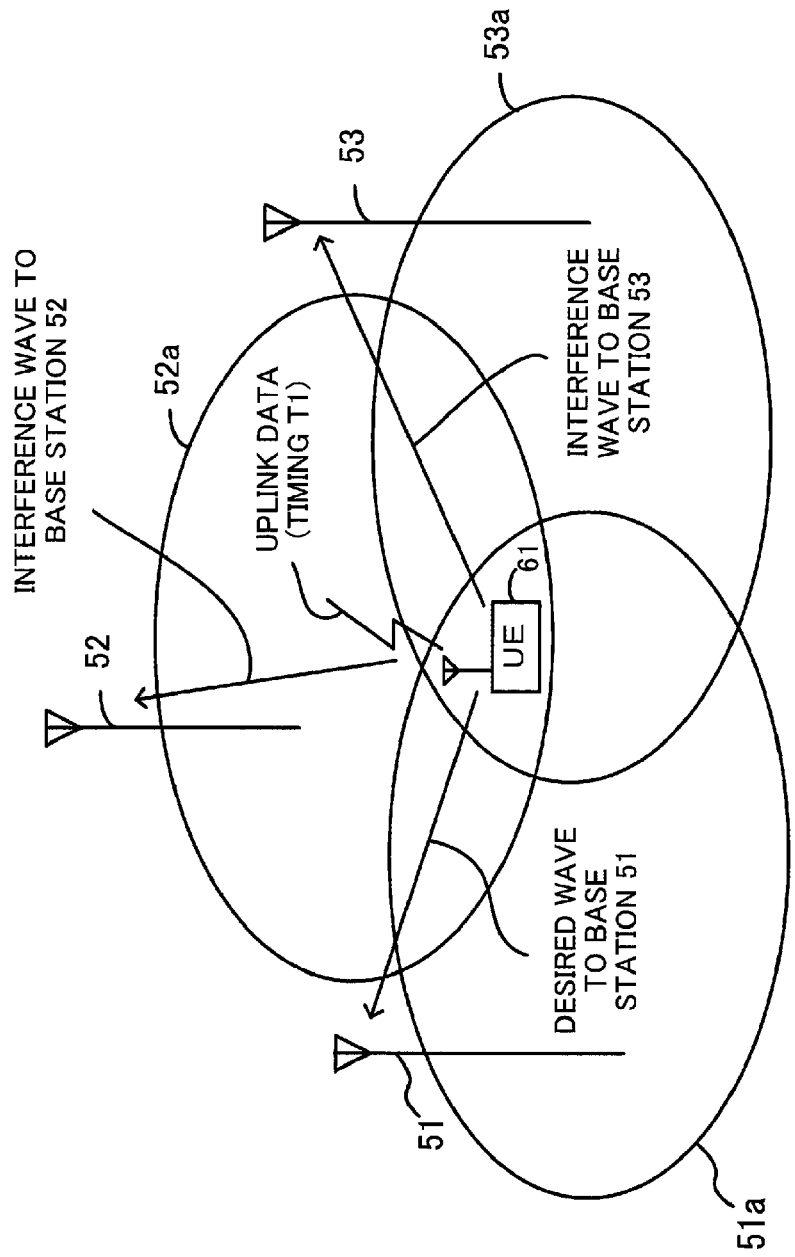
FIG. 19 also illustrates the problem caused at the time of diversity handover in HSUPA.

FIG. 14 is a flowchart illustrating the process of the base station 10a for estimating the transmit power to determine whether to accept or reject the uplink transmission.

S51: The value i is set to "1" (i=1).

S52: The uplink quality estimator 11a of the base station BSi estimates, through the scheduling process, the level where the uplink data transmission power of the user equipment will be at the time when the uplink data transmission is controlled next.

The transmit power of the user equipment is divided, for example, in such a manner that SCH (Synchronization CHannel), DCH (Dedicated CHannel) and HSUPA are allocated respective percentages of the electric power. Information on the electric power required to carry out HSUPA is included in the uplink data transmission request, and therefore, the base station is previously notified of the required transmit power.

S53: The transmission decision unit 12a of the base station BSi compares the estimated transmit power with a reference value. If the estimated transmit power is smaller than or equal to the reference value, the process proceeds to Step S54; if the estimated transmit power is greater than the reference value, the process proceeds to Step S57 (if the estimated transmit power is greater than the reference value, it is reckoned that interference affecting the communication will be caused).

S54: The value i is incremented by "1".

S55: The transmission decision unit 12a of the base station BSi determines whether or not i≦N is fulfilled. If i≦N, the process returns to Step S52; if i>N, the process proceeds to Step S56.

S56: The transmission decision unit 12a of the base station BSi notifies the user equipment of the acceptance of uplink transmission by means of the transmission acceptance/rejection signal.

S57: The transmission decision unit 12a of the base station BSi notifies the user equipment of the rejection of uplink transmission by means of the transmission acceptance/rejection signal.

As described above, the present invention enables efficient transmission of uplink data, and accordingly, improvement in throughput can be expected. Also, unwanted interference at the base station can be reduced, making it possible to improve the communication quality.

In the wireless communication system of the present invention, the base station measures the uplink quality, then compares the measured uplink quality with the reference value to determine whether to accept or reject transmission of uplink data, and transmits a transmission acceptance/rejection signal in accordance with the comparison result. The terminal receives transmission acceptance/rejection signals from multiple base stations with which the terminal is connected by diversity handover, and transmits uplink data only when it is judged that there is no base station rejecting the transmission of the uplink data. Accordingly, interference accompanying uplink transmission at the time of diversity handover can be eliminated, making it possible to improve the quality of wireless communication.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication system for performing wireless communication, comprising:
   base stations each including a measurer that measures an uplink quality representing a quality of uplink data, and a transmission decision unit that compares the measured uplink quality with a reference value to determine whether to accept or reject transmission of the uplink data, and transmits a signal in accordance with a comparison result; and
   a terminal including a signal receiver that receives the signals from the base stations with which the terminal is connected by diversity handover, and a controller that transmits the uplink data if all of the signals from the base stations indicate acceptance of transmissions of uplink data and does not transmit the uplink data if any one of the signals from the base stations indicate rejection of transmission of the uplink data.

2. The wireless communication system according to claim 1, wherein the measurer measures an interference amount as the uplink quality, and when the measured interference amount is smaller than the reference value, the transmission decision unit accepts the transmission of the uplink data.

3. The wireless communication system according to claim 1, wherein the measurer measures a data amount as the uplink quality, and when the measured data amount is smaller than the reference value, the transmission decision unit accepts the transmission of the uplink data.

4. The wireless communication system according to claim 1, wherein the transmission decision unit uses either a shared channel to notify all connected terminals of the signal, or dedicated channels to notify individual connected terminals of the signal.

5. A terminal for performing wireless communication, comprising:
   a signal receiver that receives signals from a plurality of base stations with which the terminal is connected by diversity handover, each of the signals being generated by a corresponding one of the base stations based on a result of comparison between a measured uplink quality representing a quality of uplink data and a reference value and indicative of acceptance or rejection of transmission of the uplink data; and
   a controller that transmits the uplink data if all of the signals from the base stations indicate acceptance of transmissions of uplink data and does not transmit the uplink data if any one of the signals from the base stations indicate rejection of transmission the uplink data.

6. A wireless communication system for performing wireless communication, comprising:
- base stations each including an estimator that estimates an uplink quality representing a quality of uplink data, and a transmission decision unit that determines whether to accept or reject transmission of the uplink data based on a result of estimation of the uplink quality and transmits a signal; and
- a terminal including a signal receiver that receives the signals from the base stations with which the terminal is connected by diversity handover, and a controller that transmits the uplink data if all of the signals from the base stations indicate acceptance of transmissions of uplink data and does not transmit the uplink data if any one of the signals from the base stations indicate rejection of transmission the uplink data.

7. The wireless communication system according to claim 6, wherein the estimator estimates an interference amount as the uplink quality, and when a result of estimation of the interference amount satisfies a required quality, the transmission decision unit accepts the transmission of the uplink data.

8. The wireless communication system according to claim 6, wherein the estimator estimates a data amount as the uplink quality, and when a result of estimation of the data amount satisfies a required quality, the transmission decision unit accepts the transmission of the uplink data.

9. The wireless communication system according to claim 6, wherein the estimator estimates transmit power as the uplink quality, and when a result of estimation of the transmit power satisfies a required quality, the transmission decision unit accepts the transmission of the uplink data.

10. The wireless communication system according to claim 6, wherein the transmission decision unit uses either a shared channel to notify all connected terminals of the signal, or dedicated channels to notify individual connected terminals of the signal.

* * * * *